US005936213A

United States Patent [19]

Biquez et al.

[11] Patent Number: 5,936,213

[45] Date of Patent: Aug. 10, 1999

[54] OPERATING MECHANISM FOR A FIVE-POLE PHASE INVERTER ISOLATING SWITCH

[75] Inventors: François Biquez, Brignais; Jean-Marc Willieme, La Mulatiere, both of France

[73] Assignee: Gec Alsthom T & D SA, Paris, France

[21] Appl. No.: 09/030,502

[22] Filed: Feb. 25, 1998

[30] Foreign Application Priority Data

Feb. 27, 1997 [FR] France .................................. 97 02349

[51] Int. Cl.[6] ............................ H01H 3/46; H01H 31/10; H01H 33/42; H01M 1/00; H01M 5/34

[52] U.S. Cl. ............................ 200/1 V; 200/18; 200/337; 218/7; 218/153; 218/154

[58] Field of Search ............................... 218/2–7, 12, 14, 218/44, 45, 48–50, 55, 71, 74, 75, 78, 79, 80, 84, 119, 120, 140, 146, 152, 153, 154; 200/1, 18

[56] References Cited

U.S. PATENT DOCUMENTS

| | | | |
|---|---|---|---|
| 3,665,135 | 5/1972 | Boersma et al. | 218/84 X |
| 3,800,103 | 3/1974 | Hardi-Kern et al. | 200/1 V |
| 4,357,502 | 11/1982 | Beck | 200/1 V |
| 4,814,560 | 3/1989 | Akesson | 218/84 |
| 5,107,081 | 4/1992 | Aoyama et al. | 218/84 |
| 5,128,502 | 7/1992 | Hux | 218/153 |
| 5,510,590 | 4/1996 | Hux | 218/153 X |

FOREIGN PATENT DOCUMENTS

| | | |
|---|---|---|
| 541078 | 5/1993 | European Pat. Off. . |
| 663675 | 7/1995 | European Pat. Off. . |
| 2080311 | 11/1971 | France . |
| 3810453 | 10/1988 | Germany . |

*Primary Examiner*—J. R. Scott
*Attorney, Agent, or Firm*—Sughrue, Mion, Zinn, Macpeak & Seas, PLLC

[57] ABSTRACT

An electric switch for use in a five-pole isolating switch used as a phase inverter has a fixed contact and a mobile contact cooperating with the fixed contact to open or close an electrical line. The mobile contact is moved in a longitudinal direction by an articulated pair of levers. An isolating switch used as a phase inverter having five switches comprises a single three-position actuator for maneuvering the mobile contacts through a linkage.

1 Claim, 4 Drawing Sheets

| | C1 | C2 | C3 | C4 | C5 |
|---|---|---|---|---|---|
| E1 | 0 | F | F | F | 0 |
| E0 | 0 | 0 | 0 | 0 | 0 |
| E2 | F | 0 | F | 0 | F |

OPERATING MECHANISM FOR A FIVE-POLE PHASE INVERTER ISOLATING SWITCH

BACKGROUND OF THE INVENTION

1. Field of the Invention

The invention concerns isolating switches comprising a plurality of electrical switches and in particular isolating switches with five switches used as phase inverters in a three-phase system, for example for pumping sets in which the alternator can be operated as a motor to reverse the rotation direction of the rotating machine.

2. Description of the Prior Art

FIG. 1 is a highly schematic representation of a phase inverter isolating switch of the above kind including five switches C1 through C5. It is connected between three phase inputs A, B, C and three phase outputs A', B', C'. Each switch has a fixed first contact 1 and a second contact 2 that cooperates with the first contact. The second contact 2 moves between a first position in which is it electrically connected to the fixed contact (switches C2, C3, C4) and a second position in which it is separated from the fixed contact (switches C1 and C5).

As can be seen in FIG. 1, the mobile contacts 2 of the switches C1 and C4 are electrically connected to the phase input C, the mobile contacts 2 of the switches C2 and C5 are electrically connected to the phase input A and the mobile contact 2 of the switch C3 in connected to the phase input B. The fixed contacts 1 of the switches C1 and C2 are electrically connected to the phase output A', the fixed contacts 1 of the switches C4 and C5 are electrically connected to the phase output C' and the fixed contact 1 of the switch C3 is electrically connected to the phase output B'.

FIG. 2 is a table summarizing the operation of this isolating switch used as a phase inverter. In a first position E1 of the isolating switch the switches C1 and C5 are open (in the position indicated O) and the switches C2 through C4 are closed (in the position indicated F). In this position the phase input A is electrically connected to the phase output A', the phase input B is electrically connected to the phase output B' and the phase input C is electrically connected to the phase output C'. In a second position E0 of the isolating switch the switches C1 through C5 are all open. In this position the inputs of the isolating switch are all separated from its outputs. In a final third position E2 of the isolating switch the switches C1, C3 and C5 are closed and the switches C2 and C4 are open. In this position the phase input C is electrically connected to the phase output A', the phase input B is electrically connected to the phase output B' and the phase input A is electrically connected to the phase output C'. The result of this is that the phases A and C at the output of the isolating switch are reversed relative to the E1 position of the isolating switch.

The isolating switch is designed so that it necessarily goes from the position E1 to the position E2 (or vice versa) via the position E0, other possible connections between the inputs and outputs of the isolating switch being prohibited.

The aim of the invention is to propose a switch arrangement for an isolating switch of the above kind for use as a phase inverter in which the switches are actuated by a single actuator whilst avoiding the prohibited connection possibilities.

SUMMARY OF THE INVENTION

The invention consists in an electric switch comprising a fixed first contact and a second contact adapted to cooperate with said fixed contact and to move in translation in a longitudinal direction between a first position in which it is connected to said fixed contact and a second position in which it is separated from said fixed contact, wherein said second contact is adapted to be moved by a pair of levers articulated together and comprising a first lever having one end connected to said second contact via a pivot pin mobile in translation in said longitudinal direction and a second lever having one end mounted to rotate on a pivot pin fixed relative to said first contact.

As will become apparent hereinafter, a judicious choice of the ratio between the kinematics of the linkage and the internal kinematics of the electrical switches in a switch arrangement of the above kind enables an isolating switch to be designed having five switches and operating as a phase inverter with a single three-position actuator and a linkage connecting the second levers of the switches to the actuator.

Other features and advantages will become apparent from a reading of the following description of one embodiment of the invention given with reference to the drawings.

DETAILED DESCRIPTION OF THE PREFERRED EMBODIMENT

Figures 1, 2:
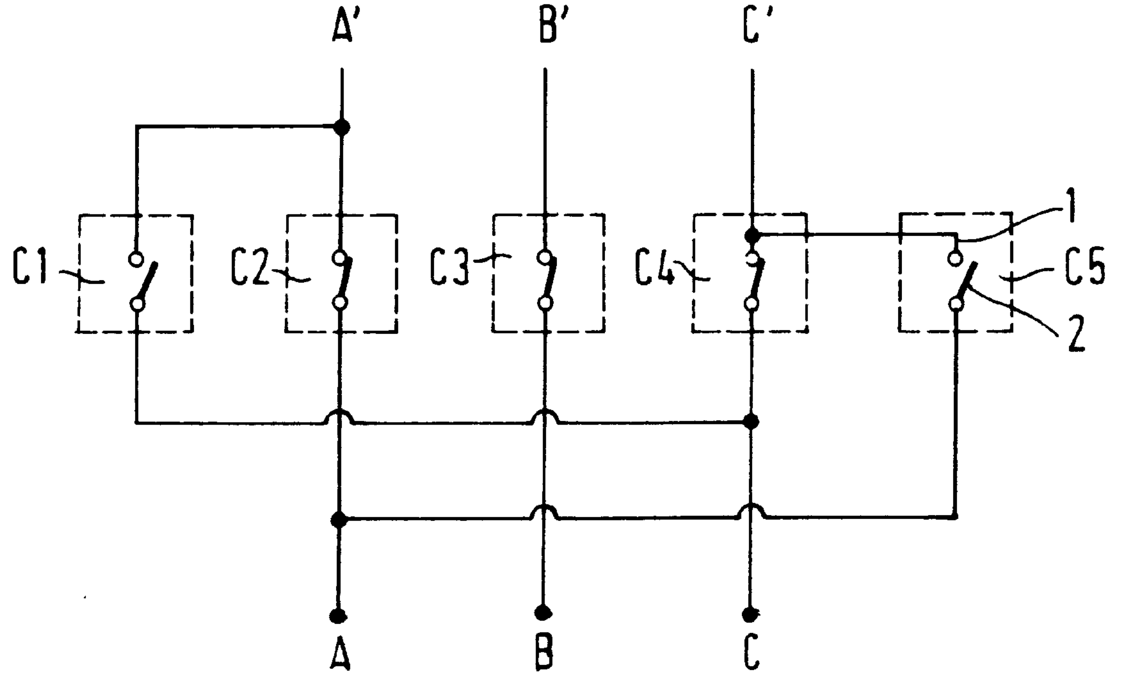
FIG. 1 is a highly schematic representation of an isolating switch including five switches and used as a phase inverter.
FIG. 2 is a table summarizing the operation of a phase inverting isolating switch of the above kind.
Figure 3:
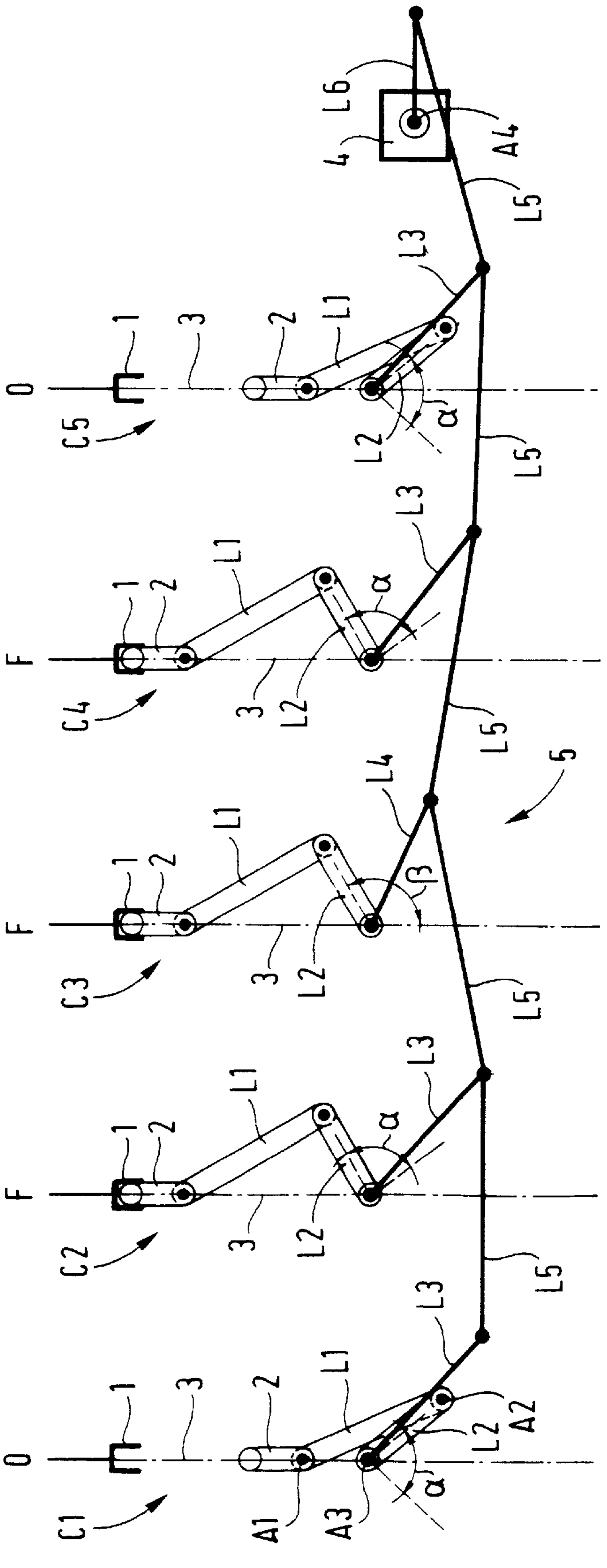
FIG. 3 is a schematic representation of a five-switch isolating switch of the invention in a first position corresponding to position E1 in the FIG. 2 table.

FIG. 3 is a schematic representation of five switches C1 through C5 in accordance with the invention that form part of a five-pole isolating switch used as a phase inverter, similar to that shown in FIG. 1, although the inputs and the outputs corresponding to the phases A through C and A' through C' are not represented.

Each switch such as C1 has a fixed contact 1 and a contact 2 that moves between a first position in which it is connected to the fixed contact 1 (closed position F of the switch) and a second position in which it is separated from the fixed contact 1 (open position O of the switch).

The mobile contact 2 moves in translation between these two positions in a longitudinal direction 3.

The mobile contact 2 is moved in translation in the direction 3 by a pair of levers L1 and L2. One end of the lever L1 is connected to the contact 2 by a pivot pin A1 mobile in translation in the longitudinal direction 3. The levers L1 and L2 are articulated together by a pivot pin A2. One end of the lever L2 rotates on a pivot pin A3 fixed relative to the contact 1. Accordingly, relative angular movement between the levers L1 and L2 is converted into movement in translation of the mobile contact 2, the length of the levers L1 and L2 and the relative angular displacement between the two levers determining the travel of the mobile contact.

Figure 4:
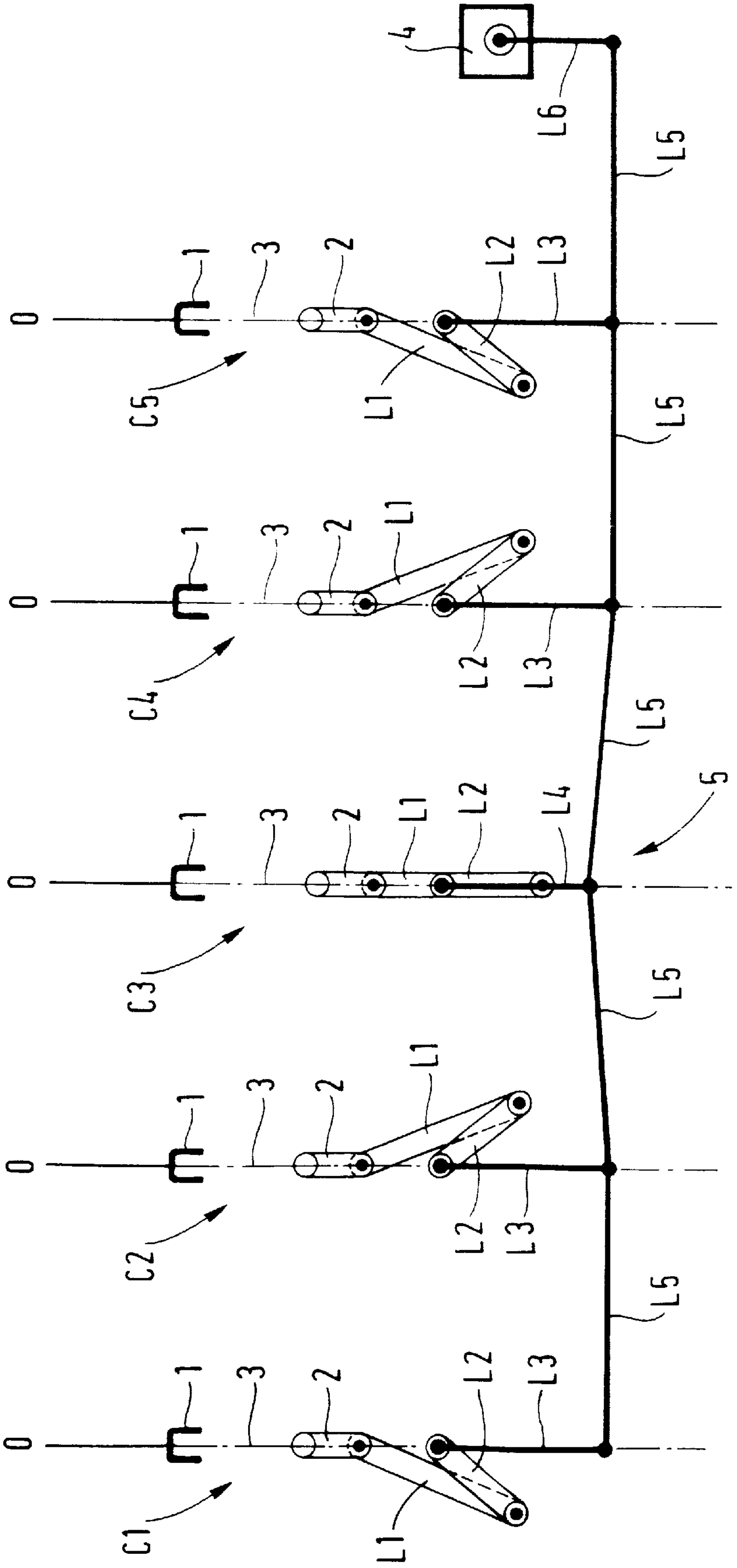
FIG. 4 shows the isolating switch from FIG. 3 in a second position corresponding to position E0 in the FIG. 2 table.
Figure 5:
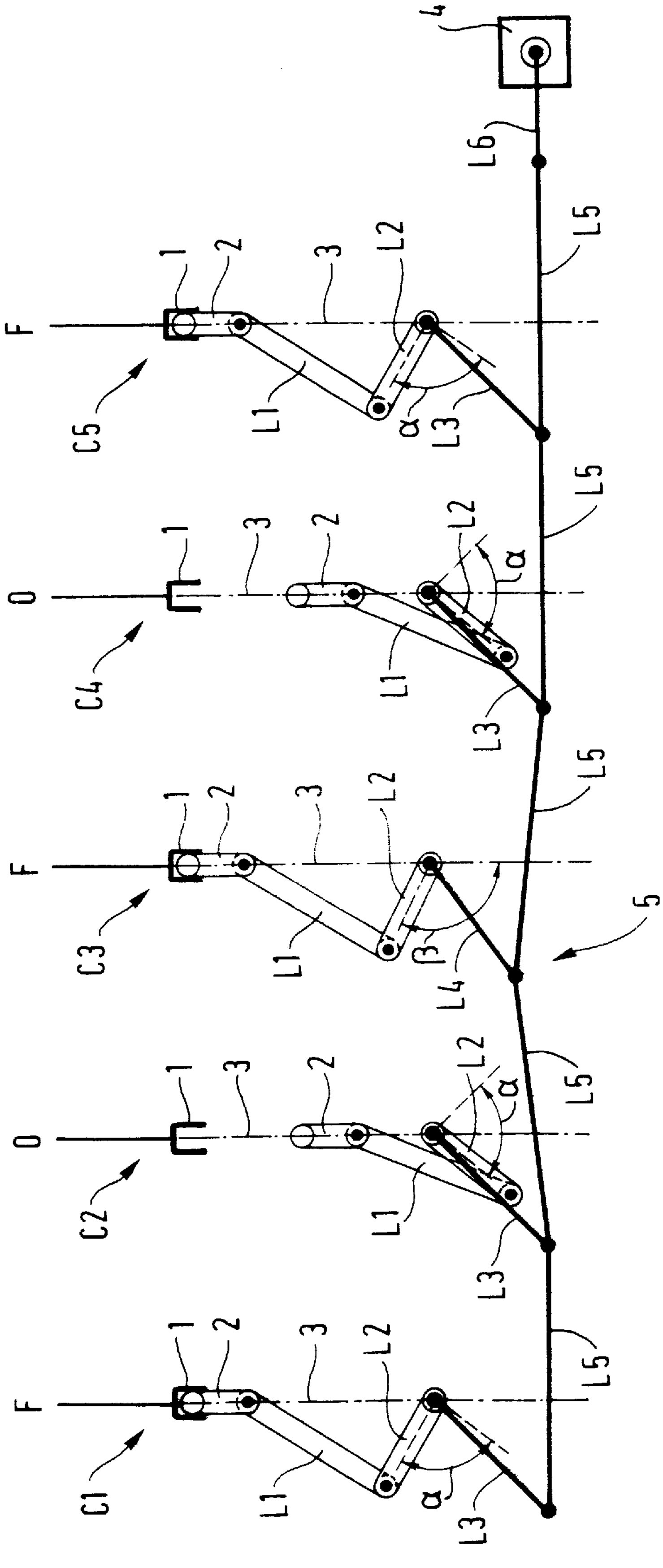
FIG. 5 shows the isolating switch from FIG. 3 in a third position corresponding to position E2 in the FIG. 2 table.

As shown in FIGS. 3 through 5 an isolating switch of the invention with five electrical switches used as a phase inverter comprises a single push-pull actuator 4 with three positions mechanically coupled to the switches by a linkage 5.

Here the three-position actuator 4 is an electric motor the rotor A4 of which transmits movement to the linkage.

The linkage 5 comprises, for each switch C1, C2, C4 and C5, a lever L3 constrained to rotate with the lever L2 of each switch and for the switch C3 a lever L4 constrained to rotate with the lever L2 of that switch.

It further includes a system of control links L5 articulated to each other in sequence and to the levers L3 and L4. One link L5 is connected to the actuator 4 by a lever L6 attached to the rotor A4 of the control 4.

The linkage 5 operates in the following manner. When the rotor A4 of the actuator 4 rotates the lever L6 moves the control link L5 to which it is connected in translation. The movement of the lever L5 is converted into angular movement of the lever L3 associated with the switch C5. This results in angular movement of the lever L2 attached to the lever L3 and therefore movement in translation of the mobile contact 2 of the switch C5. The movement in translation of the control link L5 causes movement in translation of the control link L5 associated with the switch C4, causing movement in translation of the mobile contact 2 of the switch C4, and so on for the other switches C3 through C1. Accordingly the movement in translation of the control links L5 is converted by the levers L3 and L4 into angular movement of the levers L1 and L2 of each switch C1 through C5 which is in turn converted into movement in translation of the mobile contacts 2 of the switches C1 through C5.

The positions E1, E0, E2 of the isolating switch as shown in the FIG. 2 table are based on the ratio of the kinematics of the links and the internal kinematics of the switches, the lengths of the control links L5 having no influence on the operation of the isolating switch.

To obtain the succession of closed and open positions of the switches C1, C2, C4 and C5 and of the switch C3, the levers L1 and L2 of each switch being identical, when the position of the isolating switch is changed, for example from the position E1 to the position E0, the levers L2 of the switches C1, C2, C4 and C5 must rotate through an angle $\alpha$ and the lever L2 of the switch C3 must simultaneously rotate through an angle $\beta$ such that $\beta$ satisfies the equation $3\alpha=2\beta$. This is simply obtained by making the length l of the lever L4 and the length L of the lever L3 satisfy the equation: $L*\sin(\alpha)=l*\sin(\beta)$, in other words L is greater than l.

FIG. 4 shows the isolating switch in the E0 position from the FIG. 2 table. It can be seen that in this position all the mobile contacts 2 of the switches are separated from the fixed contacts 1. Here the levers L3 and L4 are parallel. The levers L1 and L2 of the switches C1 and C5 are in identical first angular positions. The levers L1 and L2 of the switches C2 and C4 are in a second identical angular position. The levers L1 and L2 of the switch C3 are in a third angular position between the first and second angular positions mentioned above. This figure shows that the kinematics of the levers L1 and L2 of the switch C3 differ from the kinematics of the levers L1 and L2 of the switches C1, C2, C4 and C5. The angular position of the levers L1 and L2 of the switch C1 is symmetrical about the direction 3 to the angular position of the levers L1 and L2 of the switch C2.

In FIG. 3 the lever L6 has rotated 90° in a first direction relative to its FIG. 4 position. The levers L1 and L2 of the switches C1 and C5 are now in said second angular position with the result that these switches are open. The levers L2 of these switches have rotated anticlockwise through an angle $\alpha$. The levers L2 of the switches C2 and C4 have rotated anticlockwise through an angle $\alpha$ so that these switches are also closed. The lever L2 of the switch C3 has rotated anticlockwise through an angle $\beta$ greater than $\alpha$ (because the lever L4 is shorter than the levers L3) with the result that this switch is closed.

In FIG. 5 the lever L6 has rotated 90° in a second direction relative to its FIG. 4 position. The levers L1 and L2 of the switches C2 and C4 now occupy said first angular position and these switches are open. The levers L2 of these switches has therefore rotated clockwise through an angle $\alpha$. The levers L2 of the switches C1 and C5 have rotated clockwise through an angle $\alpha$ with the result that these switches are closed. The lever L2 of the switch C3 has turned clockwise through an angle $\beta$ with the result that this switch is also closed.

As shown in FIGS. 3 through 5 the isolating switch goes from position E0 to position E1 upon a first 90° rotation of the rotor of the actuator 4 and from position E0 to position E2 upon a second 90° of the rotor of the actuator 4 in the opposite direction. The angle of rotation of the rotor A4 can be other than 90° (for example 30°) but an angle of 90° guarantees that transmission is non-reversible. The length of the link L6 is chosen to suit the power of the actuator 4 and the force to be applied to move the mobile contacts 2.

The invention is not limited to the embodiment described hereinabove. For example, the linkage 5 can be replaced by a system of gears or cables.

There is claimed:

1. An isolating switch comprising:

five electric switches, each having (1) a fixed first contact, (2) a second contact moveable in translation in a longitudinal direction between a first position in which it is connected to said fixed contact and a second position in which it is separated from said fixed contact, and (3) a first lever and a second lever articulated together, said first lever having one end connected to said second contact via a pivot pin mobile in translation in said longitudinal direction, said second lever having one end mounted to rotate on a pivot pin fixed relative to said first contact;

a three position actuator; and a linkage connecting said second lever of each of said plurality of switches to said three-position actuator, said linkage including (1) a plurality of third levers, each connected to a respective second lever and constrained to rotate therewith, and (2) a plurality of control links articulated together in sequence and articulated to said plurality of third levers, one of said plurality of control links being connected to said three-position actuator via a fourth lever;

wherein (1) in a first position of said linkage, said mobile contacts of said five switches are all separated from said fixed contacts, (2) in a second position of said linkage, said mobile contacts of two electric switches are separated from their respective fixed contacts and said mobile contacts of the other three electric switches are connected to their respective fixed contacts, and (3) in a third position of said linkage, said mobile contacts of said two electric switches and said mobile contact of one of said other three electric switches are connected to their respective fixed contacts whereas said mobile contacts of the remaining two of said other three electric switches are separated from their respective fixed contacts.

* * * * *